C. H. VICTORY.
SNOW-SHOVEL.

No. 192,853. Patented July 10, 1877.

Witnesses

William H. Low.

John Campbell

Inventor.

Charles H. Victory

UNITED STATES PATENT OFFICE.

CHARLES H. VICTORY, OF ALBANY, NEW YORK, ASSIGNOR OF ONE-HALF HIS RIGHT TO ALONZO P. ADAMS, OF SAME PLACE.

IMPROVEMENT IN SNOW-SHOVELS.

Specification forming part of Letters Patent No. 192,853, dated July 10, 1877; application filed May 15, 1877.

*To all whom it may concern:*

Be it known that I, CHARLES H. VICTORY, of the city and county of Albany, and State of New York, have invented a new and useful Improvement on Snow-Shovels, of which the following is a full and exact description, reference being had to the accompanying drawing, making a part of this specification, in which—

Figure 1:
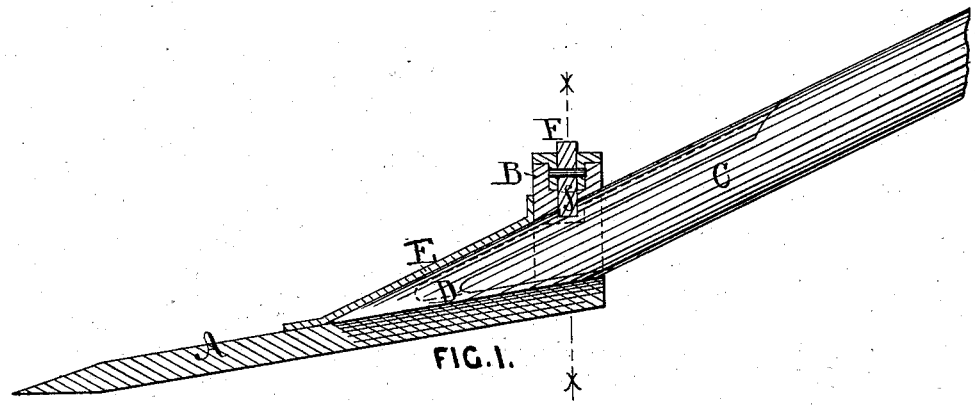
Figure 2:
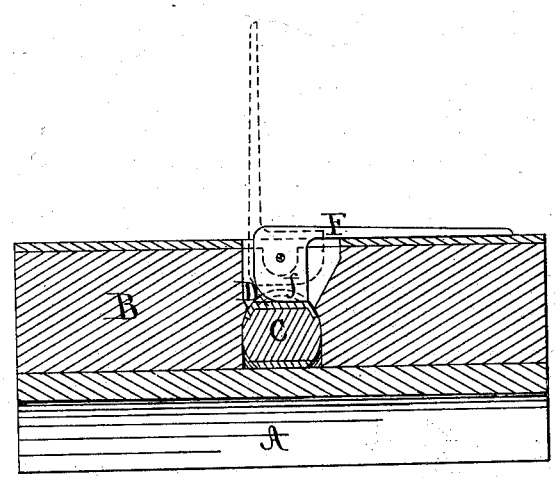

Figure 1 is a longitudinal section of the blade of the shovel, and Fig. 2 a transverse section at the line $x\ x$.

My invention consists in constructing the shovel with a detachable handle, which, when occasion requires it, may be removed from the blade and used as a pick-bar, for the purpose of breaking up hard snow, ice, &c.

As shown in the drawing, A is the blade of the shovel, and B the back-piece thereof; C, the handle, which is provided at its lower extremity with a metallic socket, D, terminating in a chisel-shaped point. The handle is inserted in an opening formed in the back-piece B, and enters a socket, E, which is secured to the blade and may be made, as shown in the drawing, so as to extend from the blade to the back-piece to form a stay between these two parts, covering the entire end of the handle projecting through the back-piece; or it may be made of sufficient length to fairly receive the chisel-point of the handle. The handle is attached to the blade by means of the cam-lever F, the cam $f$ of which enters a notch formed in the socket D of the handle, thereby preventing it from slipping from the blade, while the eccentricity of the cam holds the two parts securely together. The handle can be detached from the blade by simply throwing the cam-lever into the position indicated by the dotted lines shown in Fig. 2, which movement carries the cam $f$ out of the notch in the handle, thereby permitting it to be readily removed from the blade.

It is manifest that this detachable handle, to be used as a pick-bar, may be readily adapted to rakes, hoes, and other similar agricultural implements.

I do not confine myself to the precise means herein shown and described for securing the handle to the blade, as it is obvious that the attachment may be made in various ways.

I claim as my invention—

1. The combination of the shovel-blade A with the detachable chisel-pointed handle C, as and for the purpose herein specified.

2. The detachable handle C of a shovel or other implement, provided with a metallic chisel-point, D, as and for the purpose herein specified.

CHARLES H. VICTORY.

Witnesses:
    WILLIAM H. LOW,
    JOHN CAMPBELL.